(12) United States Patent (10) Patent No.: US 7,468,522 B2
Engstrand (45) Date of Patent: Dec. 23, 2008

(54) COLLAR, SYSTEM AND METHOD FOR DETECTING A MARK ON A ROD

(75) Inventor: Bradley Engstrand, Hartford, WI (US)

(73) Assignee: Phaedrus, LLC, Hartford, WI (US)

( * ) Notice: Subject to any disclaimer, the term of this patent is extended or adjusted under 35 U.S.C. 154(b) by 169 days.

(21) Appl. No.: 11/412,152

(22) Filed: Apr. 25, 2006

(65) Prior Publication Data

US 2007/0246644 A1 Oct. 25, 2007

(51) Int. Cl.
*G01N 21/86* (2006.01)
*G01V 8/00* (2006.01)

(52) U.S. Cl. ............... 250/559.29; 250/231.1; 91/1; 92/5 R

(58) Field of Classification Search ............. 250/231.1, 250/231.13–231.18, 559.29; 91/1; 92/5 R
See application file for complete search history.

(56) References Cited

U.S. PATENT DOCUMENTS

| 4,661,695 | A | | 4/1987 | Mori et al. |
|---|---|---|---|---|
| 4,806,707 | A | | 2/1989 | Landmeier |
| 4,902,903 | A | * | 2/1990 | Segerson et al. ........ 250/559.29 |
| 5,182,979 | A | | 2/1993 | Morgan |
| 5,744,705 | A | | 4/1998 | Derouen et al. |
| 6,600,144 | B2 | * | 7/2003 | Matthies .................... 250/208.1 |
| 6,952,009 | B1 | * | 10/2005 | Engstrand ................ 250/231.1 |

* cited by examiner

*Primary Examiner*—Seung C Sohn
(74) *Attorney, Agent, or Firm*—Patents & TMS, P.C.

(57) ABSTRACT

A collar, a system and a method detect a mark on a rod within an interior of the collar. The mark and the rod move from a first position to a second position within an interior of the collar between a first end and a second end of the collar. A light emitter and/or a light detector is connected to the collar for determining the first position and/or the second position of the mark and/or of the rod within the interior of the collar. An exterior surface of the rod and/or a mark on the rod absorb an amount of light emitted from the light emitter within the interior of the collar. The light detector measures and/or detects an intensity of light within the interior of the collar which is not be absorbed by the mark and/or by the exterior surface of the rod. The intensity of light within the interior of the collar detected by the light detector that is not absorbed by the mark or the exterior surface of the rod corresponds to the first position and/or to the second position of the mark within the interior of the collar.

20 Claims, 2 Drawing Sheets

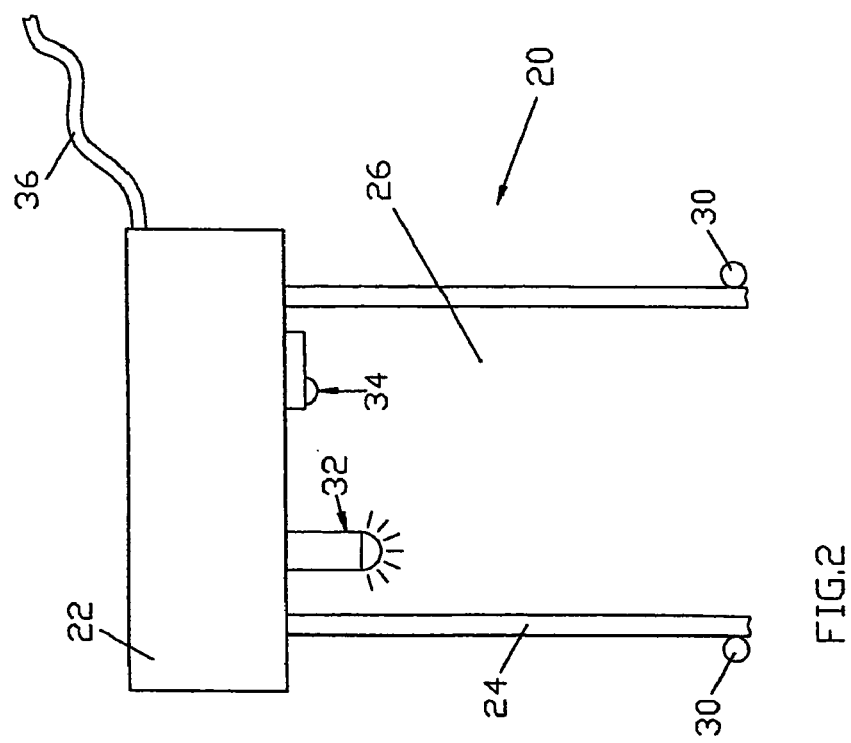
FIG.2
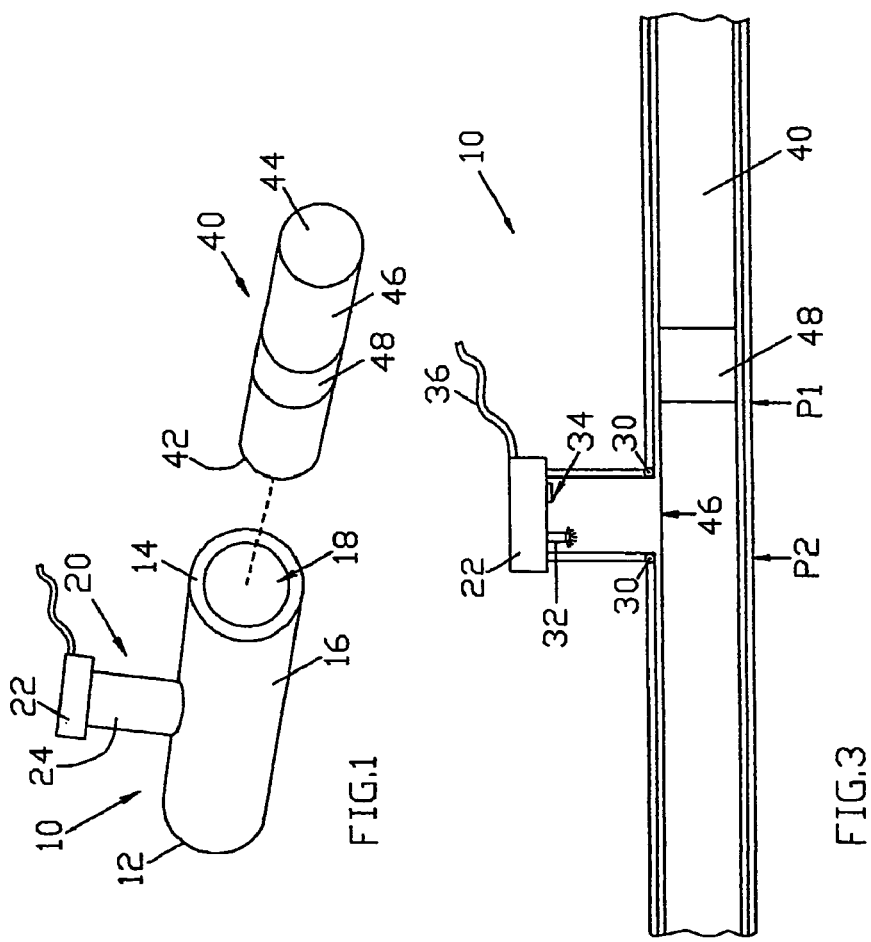
FIG.1
FIG.3

COLLAR, SYSTEM AND METHOD FOR DETECTING A MARK ON A ROD

BACKGROUND OF THE INVENTION

The present invention generally relates to a collar, a system and a method for detecting a mark on a rod. More specifically, the present invention relates to a collar, a system and a method for detecting a mark on a rod with a light emitter and/or a light detector. The light emitter and/or the light detector may be located inside of and/or may be housed within a compartment which is attachable to the collar. A seal may connect and/or may attach the compartment to the collar for emitting and/or for transmitting light into the collar and/or into the compartment. An amount of the emitted light from the light emitter may be absorbed by an exterior surface of the rod. The mark on the rod may display a color which may be detectable by the light detector with the mark adjacent to the light detector. The color of the mark may prevent the emitted light from being absorbed by the mark which may be adjacent to the light emitter, the light detector and/or the compartment. The light detector may detect, may identify and/or may determine a position of the mark and/or of the rod within the collar via an intensity of the emitted light which may be detectable via the light detector.

It is, of course, generally known to detect and/or to determine a position of a rod in an interior of a cylinder with a switch which is attached to the cylinder. Traditionally, the switch is a magnetic switch, such as, for example, a reed switch or a Hall Effect switch for detecting and/or for determining the position of the rod in the cylinder. The switch may be located or may be positioned at a location on the cylinder for detecting and/or for determining the position of the rod within the interior of the cylinder. The location of the switch may be an exterior surface of the cylinder. Walls of the cylinder may separate and/or may be located between the switch and the rod and/or the interior of the cylinder.

The rod or a portion of the rod activates or deactivates the switch as the rod or the portion of the rod is adjacent to the switch by altering a magnetic characteristic of the switch. The rod or the portion of the rod activates or deactivates the switch as the rod or the portion of the rod moves to a location adjacent to the switch within the interior of the cylinder by altering the magnetic characteristic of the switch. Activating or deactivating the switch may indicate and/or may identify the position of the rod within the interior of the cylinder. As a result, the switch detects and/or determines the position of the rod within the interior of the cylinder as the rod or the portion of the rod moves to a location adjacent to the switch within the interior of the cylinder.

However, the traditional switch may be small and may be delicate which may prevent the switch from being used with large voltages and/or with large currents. Additionally, large currents may overheat the switch which may damage and/or may destroy the switch. As a result, the switch may be inoperable and may be incapable of detecting and/or determining the position of the rod within the interior of the cylinder. Switching large currents may require and/or may necessitate a relay circuit to be connected to the switch for detecting and/or for determining the position of the rod within the interior of the cylinder. The relay circuit may be costly and/or may be inconvenient to attach to the switch and/or to the cylinder. Further, the rod or the portion of the rod may be made from a material which may not alter the magnetic characteristic of the switch. Still further, the rod or the portion of the rod may be made from a material which does not activate or deactivate the switch. As a result, the material of the rod or of the portion of the rod may prevent the switch from detecting and/or from determining the position of the rod within the interior of the cylinder.

A need, therefore, exists for a collar, a system and/or a method for detecting a mark on a rod which may be located and/or may be positioned within an interior of the collar. Additionally, a need exists for a collar, a system and/or a method for detecting a mark on a rod which may provide a light detector and/or a light emitter for determining a position of the rod within an interior of the collar. Further, a need exists for a collar, a system and/or a method for detecting a mark on a rod which may display a color on the mark for preventing light from being absorbed by the mark of the rod within an interior of the collar. Still further, a need exists for a collar, a system and/or a method for detecting a mark on a rod which may provide a seal for connecting and/or for attaching a compartment, a light emitter and/or a light detector to an interior of the collar. Moreover, a need exists for a collar, a system and/or a method for detecting a mark on a rod which may absorb an amount of light within an interior of the collar which may correspond to a position of the rod within the interior of the collar. Furthermore, a need exists for a collar, a system and/or a method for detecting a mark on a rod which may detect and/or may determine a position of the rod within an interior of the collar based on an intensity of the light which may not be absorbed by the mark and/or by an exterior surface of the rod.

SUMMARY OF THE INVENTION

The present invention provides a collar, a system and/or a method for detecting a mark on a rod. The collar may have an interior of a compartment for housing and/or for storing a light emitter and/or a light detector. The light emitter may transmit and/or may emit light into the interior of the compartment and/or into an interior of the collar. The rod may have an exterior surface which may absorb an amount of the light within the interior of the compartment and/or within the interior of the collar. The mark may be located on the exterior surface of the rod which may display a color which may correspond to a color of the light within the interior of the collar. The color of the mark may not absorb an amount of the light within the interior of the collar as the mark may be adjacent to the light emitter, the light detector and/or the compartment.

The light detector may measure, may detect and/or may identify an intensity of the light within the interior of the collar which may not be absorbed by the rod and/or the mark of the rod. The intensity of the light which may be detected by the light detector may determine, may detect and/or may determine that the mark may be adjacent to the light emitter, the light detector and/or the compartment. The light detector may detect and/or may determine the position of the mark and/or of the rod within the interior of the collar based on the intensity of the light which may be detectable by the light detector.

To this end, in an embodiment of the present invention, a collar for locating a position of a rod wherein the rod has a length defined between a first end and a second end and further wherein the rod has an exterior surface connecting the first end and the second end wherein a mark is located on the exterior surface of the rod is provided. The collar has exterior walls defining an interior wherein the exterior walls have a length defined between a first end and a second end wherein the rod is insertable into the interior. Further, the collar has an aperture formed within the exterior walls wherein the aperture is located between the first end and the second end of the exterior walls wherein light projects through the aperture into the interior of the exterior walls. Moreover, the collar has a light detector connected to the exterior walls wherein the light detector is adjacent to the aperture within the exterior walls wherein the light detector detects an intensity of light within the interior of the exterior walls wherein the intensity of the light corresponds to an amount of light that is absorbed by the mark wherein the intensity of light detected by the light detector corresponds to a position of the mark within the interior of the exterior walls.

In an embodiment, the collar has a light emitter connected to the exterior walls wherein the light emitter is adjacent to the aperture within the exterior walls.

In an embodiment, the intensity of light detected by the light detector corresponds to an amount of light that is absorbed by the exterior surface of the rod.

In an embodiment, the collar has a compartment connected to the exterior walls wherein the compartment is adjacent to the aperture within the exterior walls.

In an embodiment, the collar has a seal connected to the exterior walls wherein the seal is located between the light detector and the aperture within the exterior walls.

In an embodiment, the collar has a cable connected to the light detector wherein the cable extends outwardly with respect to the exterior walls.

In another embodiment of the present invention, a system for locating a mark displayed on a rod wherein the rod has an exterior surface connecting a first end of the rod and a second end of the rod wherein the mark is located on the exterior surface of the rod between the first end and the second end is provided. The system has a compartment having a base and exterior walls wherein the exterior walls are attached to the base wherein the exterior walls and the base define an interior of the compartment wherein an aperture is formed in the exterior walls of the compartment. The rod moves from a first position to a second position with respect to the aperture of the compartment wherein the exterior surface of the rod is adjacent to the aperture of the compartment in the first position and further wherein the mark on the rod is adjacent to the aperture of the compartment in the second position. Moreover, the system has a light detector connected to the base of the compartment wherein the light detector is opposite to the aperture of the compartment wherein the light detector is within the interior of the compartment. The light detector detects an intensity of light within the interior of the compartment which is not absorbed by the mark on the rod or the exterior surface of the rod wherein the intensity of light corresponds to the first position or the second position of the rod with respect to the aperture of the compartment.

In an embodiment, the system has a light emitter connected to the compartment wherein the light emitter emits light into the interior of the compartment.

In an embodiment, the mark is a paint that is applied to the exterior surface of the rod wherein the paint corresponds to the light within the interior of the compartment.

In an embodiment, the system has a seal connected to the compartment wherein the seal is located between the exterior surface of the rod and the exterior walls of the compartment.

In an embodiment, the system has a microprocessor connected to the light detector wherein the microprocessor detects the first position or the second position of the rod with respect to the aperture of the compartment.

In an embodiment, the system has a data communication network connected to the light detector wherein the light detector is accessible via the data communication network.

In an embodiment, the system has an output signal indicative of the intensity of light within the interior of the compartment wherein the output signal is transmittable by the light detector.

In another embodiment of the present invention, a method for detecting a location of mark on a rod wherein the rod has an exterior surface connecting a first end of the rod and a second end of the rod wherein the mark is located on the exterior surface between the first end and the second end of the rod is provided. The method has the step of providing a collar having a length defined between a first end and a second end wherein the collar has exterior walls defining an interior wherein the rod is located within the interior of the collar wherein the rod is located at a first position within the interior of the collar wherein an aperture is formed within the exterior walls of the collar wherein the first position of the rod is adjacent to the aperture. Further, the method has the step of detecting an intensity of light within the interior of the collar wherein the intensity of light corresponds to a first amount of light which is not absorbed by the exterior surface of the rod or a second amount of light which is not absorbed by the mark. Moreover, the method has the step of determining the first position of the rod within the interior of the collar wherein the first position of the rod corresponds to the intensity of light detected within the interior of the collar.

In an embodiment, the method has the step of moving the rod from the first position to a second position within the interior of the collar.

In an embodiment, the method has the step of connecting a machine element to the rod wherein the machine element moves the rod within the interior of the collar between the first end of the collar and the second end of the collar.

In an embodiment, the method has the step of forming an aperture within the exterior walls of the collar wherein the light is emitted into the interior of the collar via the aperture.

In an embodiment, the method has the step of connecting a light detector to the collar wherein the light detector detects that the rod is located in the first position or the second position within the interior of the collar.

In an embodiment, the method has the step of connecting a light emitter to the collar wherein the light emitter emits light into the interior of the collar.

In an embodiment, the method has the step of connecting a microprocessor to the collar wherein the microprocessor detects that the rod is located in the first position.

It is, therefore, an advantage of the present invention to provide a collar, a system and a method for detecting a mark on a rod.

Another advantage of the present invention is to provide a collar, a system and a method for detecting a mark on a rod which may provide a light detector and/or a light emitter for detecting and/or for determining a position of the mark and/or of the rod within an interior of the collar.

Yet another advantage of the present invention is to provide a collar, a system and a method for detecting a mark on a rod which may display a color on the mark for determining and/or for detect a position of the mark and/or of the rod within an interior of the collar.

Still another advantage of the present invention is to provide a collar, a system and a method for detecting a mark on a rod which may operate with larger voltages and/or with larger current than a reed switch and/or a Hall effect switch.

Another advantage of the present invention is to provide a collar, a system and a method for detecting a mark on a rod which may determine, may detect, may identify and/or may locate a position of the mark and/or of the rod within an interior of the collar.

Still another advantage of the present invention is to provide a collar, a system and a method for detecting a mark on a rod which may operate at larger voltages without a relay circuit being attached to and/or connected to the system.

Yet another advantage of the present invention is to provide a collar, a system and a method for detecting a mark on a rod which may emit light into an interior of the collar for detecting a position of the mark and/or of the rod within the interior of the collar.

Another advantage of the present invention is to provide a collar, a system and a method for detecting a mark on a rod which may provide a seal to connect and/or to attach a light emitter and/or a light detector to the collar.

And, another advantage of the present invention is to provide a collar, a system and a method for detecting a mark on a rod which may absorb an amount of light from a light emitter to detect and/or to determine a position of the mark and/or of the rod within an interior of the collar.

Still further, an advantage of the present invention is to provide a collar, a system and a method for detecting a mark on a rod which may detect an amount of emitted light which may measure an intensity of light which may not be absorbed by the mark and/or by the rod to detect a position of the mark and/or of the rod within an interior of the collar.

Yet another advantage of the present invention is to provide a collar, a system and a method for detecting a mark on a rod which may determine and/or may detect a position of the mark and/or of the rod within an interior of the collar based on an intensity of light which may not be absorbed by the mark.

Still another advantage of the present invention is to provide a collar, a system and a method for detecting a mark on a rod which may emit light of a color which may correspond to and/or may be based on a color displayed by the mark of the rod.

Another advantage of the present invention is to provide a collar, a system and a method for detecting a mark on a rod which may detect, may identify and/or may determine that the mark and/or the rod may have moved from a first position to a second position within an interior of the collar.

Still another advantage of the present invention is to provide a collar, a system and a method for detecting a mark on a rod which may measure a movement of the rod within an interior of the collar.

Additional features and advantages of the present invention are described in, and will be apparent from, the detailed description of the presently preferred embodiments and from the drawings.

BRIEF DESCRIPTION OF THE DRAWINGS

FIG. 1 illustrates a perspective view of a collar and a rod in an embodiment of the present invention.

FIG. 2 illustrates a cross-sectional view of a compartment with a light emitter and a light detector in another embodiment of the present invention.

FIG. 3 illustrates a cross-sectional view of a collar and a rod in another embodiment of the present invention.

DETAILED DESCRIPTION OF THE PRESENTLY PREFERRED EMBODIMENTS

Figure 4:
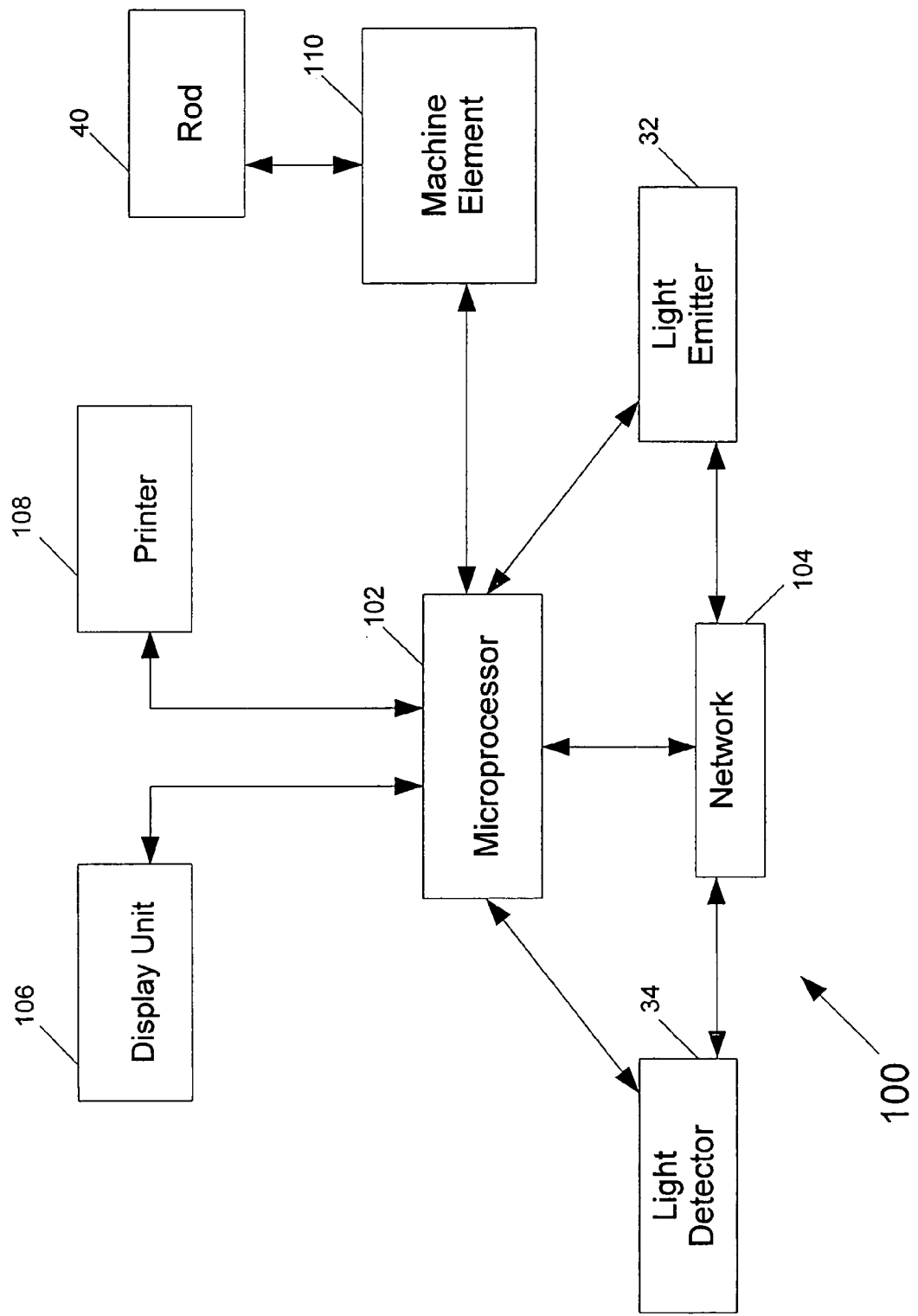
FIG. 4 illustrates a black box diagram of a system in an embodiment of the present invention.

The present invention generally relates to a collar, a system and a method for detecting a mark on a rod. The mark and/or the rod may be movable from a first position to a second position within an interior of the collar. The collar may have a light emitter and/or a light detector for identifying the first position and/or the second position of the mark and/or of the rod within the interior of the collar. An exterior surface of the rod may absorb an amount of light emitted by the light emitter within the interior of the collar. The light detector may measure and/or may detect an intensity of the emitted light within the collar which may not be absorbed by the mark on the rod and/or the exterior surface of the rod. The intensity of the light which may not be absorbed by the mark may correspond to and/or may be based on the first position and/or on the second position of the mark and/or of the rod within the interior of the collar.

Referring now to the drawings wherein like numerals refer to like parts, FIG. 1 illustrates a collar 10 in an embodiment of the present invention. The collar 10 may have a first end 12 and a second end 14 which is located opposite to the first end 12. The collar 10 may have exterior walls 16 which may define an interior 18. A collar 10 may have a compartment 20 which may be connected to and/or may be attached to the exterior walls 16 of the collar 10. The compartment 20 may be attached to and/or may be connected to the collar 10 between the first end 12 and the second end 14 of the collar 10.

The compartment 20 may have a base 22 and/or exterior walls 24 which may define an interior 26 of the compartment 20 as shown in FIG. 2. The compartment 20 may be aligned with and/or may be adjacent to an opening 28 in the exterior walls 16 of the collar 10 as shown in FIG. 3. The opening 28 in the exterior walls 16 may extend from the exterior walls 16 to the interior 18 of the collar 20. As a result, the interior 18 of the collar 10 may be accessible from the interior 26 of the compartment 20 via the opening 28 in the exterior walls 16 of the collar 10.

A seal 30 may be attached to and/or may be connected to the exterior walls 24 of the compartment 20 as shown in FIG. 2. The seal 30 may attach and/or may connect the exterior walls 24 of the compartment 20 to the exterior walls 16 of the collar 10 as shown in FIG. 3. The seal 30 may be located between and/or may be positioned between the exterior walls 16 of the collar 10 and the exterior walls 24 of the compartment 20. As a result, the compartment 20 may be attached to, may be connected to and/or may be secured to the collar 10 via the seal 30. The seal 30 may be made from a material, such as, for example, rubber, polyethylene, polyurethane, plastic and/or the like. The present invention should not be deemed as limited to a specific embodiment of the material of the seal 30.

A light emitter 32 and/or a light detector 34 may be attached to and/or may be connected to the base 22 of the compartment 20 as shown in FIGS. 2 and 3. The light emitter 32 and/or the light detector 34 may be located within the interior 26 of the compartment 20. The light emitter 32 may be connected to and/or may be in communication with the light detector 34. The light emitter 32 may be adjacent to the light detector 34 within the interior 26 of the compartment 20.

The light emitter 32 may transmit, may emit and/or may project an emitted light into the interior 26 of the compartment 20. The light emitter 32 may transmit, may emit and/or may project the light into the interior 18 of the collar 10 via the opening 28 in the exterior walls 16 of the collar 10 from the interior 26 of the compartment 20. The light emitted from the light emitter 32 may be a first color, such as, for example, red, orange, yellow, green, blue, indigo or violet. The light emitter 32 may be, for example, a light emitting diode, a halogen light, a fluorescent light, an incandescent light, a neon light and/or the like. The light emitted from the light emitter 32 may be continuous, uninterrupted and/or may be uniform within the interior 18 of the collar 10 and/or within the interior 26 of the compartment 20. The present invention should not be deemed as limited to a specific embodiment of the light emitter 32. It should be understood that the light emitter 32 may be any light source capable of projecting, emitting and/or transmitting the light as known to one of ordinary skill in the art.

The light detector 34 may detect, may measure, may sense, may identify and/or may determine an intensity of the light emitted from the light emitter 32 within the interior 26 of the compartment 20. The light detector 34 may detect, may measure, may sense, may identify and/or may determine an intensity of the light emitted from the light emitter 32 within the interior 18 of the collar 10. The light detector 34 may be programmed to detect, to identify and/or to determine the first color of the light emitted from the light emitter 32 within the interior 26 of the compartment 20 and/or within the interior 18 of the collar 10.

A cable 36 may be attached to and/or may be connected to the base 22 of the compartment 20. The cable 36 may be connected to and/or may be attached to the light emitter 32 and/or the light detector 34 via the base 22 of the compartment 20. The light emitter 32 and/or the light detector 34 may be connected to and/or may be in communication with a microprocessor 102 (shown in FIG. 4) via the cable 36 and/or the base 22 of the compartment 20. The microprocessor 102 may be programmed to operate, to activate and/or to deactivate the light emitter 32 and/or the light detector 34. As a result, the light emitter 32 and/or the light detector 34 may be operated by, may be activated by and/or may be deactivated by the microprocessor 102. The microprocessor 102 may determine, may identify and/or may detect the intensity of the light within the interior 26 of the compartment 20 and/or within the interior 18 of the collar 20.

A rod 40 may be insertable into the interior 18 of the collar 10 as shown in FIGS. 1 and 3. The rod 40 may have a first end 42 and a second end 44 which is located opposite to the first end 42. The rod 40 may have an exterior surface 46 which may abut, may contact and/or may be adjacent to exterior walls 16 of the collar 10 with the rod 40 within the interior 18 of the collar 10. The interior 18 of the collar 10 may be sized to receive the rod 40 for inserting and for moving the rod 40 within the interior 18 of the collar 10. The exterior surface 46 of the rod may absorb an amount of the light emitted by the light emitter 32.

The rod 40 may be made from a first material, such as, for example, steel, iron and/or the like. In an embodiment, the exterior surface 46 of the rod 40 may be, for example, a finish, a varnish, a light absorbing substance and/or a polish which may be continuous and/or may be consistent between the first end 42 and the second end 44 of the rod 40. As a result, the exterior surface 46 of the rod 40 may absorb an amount of the light emitted from the light emitter 32 based on the first material of the rod 40. The present invention should not be deemed as limited to a specific first material of the rod 40.

The exterior surface 46 of the rod 40 may have a mark 48 which may be located between the first end 42 and the second end 44 of the rod 40. In an embodiment, the mark 48 on the exterior surface 46 may be made from a second material, such as, for example, a latex, a coating, a paint, a varnish, a shellac, a lacquer, a finish, an enamel, and/or titanium dioxide. As a result, the mark 48 may not absorb an amount of the light emitted from the light emitter 32 based on the second material of the mark 48.

In an embodiment, the mark 48 may be applied to the exterior surface 46 of the rod by a painting process. In an embodiment, the mark 48 may be adhered to the exterior surface 46 of the rod 40. In an embodiment, the mark 48 may be integrally formed on the exterior surface 46 of the mark 40. The present invention should not be deemed as limited to a specific embodiment of the second material of the mark 48 on the exterior surface 46 of the rod 40.

The mark 48 on the exterior surface 46 of the rod 40 may display a second color, such as, for example, red, orange, yellow, green, blue, indigo or violet. The second color of the mark 48 may correspond to, may be based on and/or may be associated with the first color of the light emitted from the light emitter 32. As a result, the mark 48 on the exterior surface 46 may not absorb an amount of the emitted light from the light emitter 32 based on the first color of the light emitted and/or the second color of the mark 48.

The rod 40 may be inserted into and/or may be located within the interior 18 of the collar 10 as shown in FIG. 3. As a result, the rod 40 may be located and/or may be positioned within the interior 18 between the first end 12 and the second end 14 of the collar 10. The light emitter 32 may transmit and/or may project the emitted light within the interior 26 of the compartment 20 and/or within the interior 18 of the collar 10 to detect a first position P1 of the mark 48 within the interior 18 of the collar 10. The first position P1 may be located between and/or may be positioned between the second end 14 and the opening 28 of the collar 10. Alternatively, the first position P1 may be located between and/or may be positioned between the first end 12 and the opening 28 of the collar 10.

The rod 40 may be attached to and/or may be connected to a machine element 110 (as shown in FIG. 4) which may move the rod 40 between the first end 12 and the second end 14 within the interior 18 of the collar 10. As a result, the mark 48 may move within the interior 18 between the first end 12 and the second end 14 of the collar 10 from the first position P1 to a second position P2. The second position P2 may be adjacent to the opening 28 of the collar 10, the interior 26 of the compartment 20, the light emitter 32 and/or the light detector 34. The light emitter 32 may emit, may transmit and/or may project the light within the interior 18 of the collar 10 and/or within the interior 26 of the compartment 20 for detecting the second position P2 of the mark 48 within the interior 18 of the collar 10.

The rod 40 may transpose through and/or may move through the interior of the collar 10, the exterior surface 46 of the rod 40 may absorb an amount of the light emitted from the light emitter 32 within the interior 18 of the collar 10. At the first position P1, the exterior surface 46 of the rod 40 may be adjacent to the opening 28 of the collar 10, the interior 26 of the compartment 20, the light emitter 32 and/or the light detector 34. The amount of the light within the interior 18 of the collar 10 which may be absorbed by the exterior surface 46 of the rod 40 may correspond to and/or may be based on the first position P1 of the mark 48 on the rod 40. The light detector 34 may determine, may detect and/or may measure the intensity of the light within the interior 18 of the collar 10 which may not be absorbed by the exterior surface 46 of the rod 40. The intensity of the emitted light which may not be absorbed by the exterior surface 46 of the rod 40 may correspond to and/or may be based on the first position P1 of the mark 48 on the rod 40.

The light detector 34 may determine, may detect and/or may identify the first position P1 of the mark 48 on the rod 40 within the interior 18 of the collar 10. The light detector 34 may transmit an output signal indicative of the intensity of the light within the interior 18 of the collar 10 and/or indicative of the first position P1 to the microprocessor 102 via the cable 36. The microprocessor 102 and/or the light detector 34 may be programmed to translate the intensity of the light within the interior 18 of the collar 10 which may not be absorbed by the exterior surface 46 of the rod 40 to detect, to determine and/or to identify the first position P1 of the mark 40. As a result, the light detector 34 and/or the microprocessor 102 may locate the mark 48 and/or the rod 40 within the interior 18 of the collar 10.

The rod 40 may transpose through and/or may move through the interior 18 of the collar 10 between the first end 12 and the second end 14 of the collar 10, the mark 48 on the rod 40 may move to and/or may be located at the second position P2 as shown in FIG. 3. At the second position P2, the mark 48 on the rod 40 may be adjacent to the opening 28 of the collar 10, the interior 26 of the compartment, the light emitter 32 and/or the light detector 34. At the second position, the mark 48 may not absorb the amount of the light emitted from the light emitter 32 within the interior 18 of the collar 10 which may be absorbed by the exterior surface 46 of the rod 40.

The light detector 34 may determine, may detect, may measure and/or may identify the intensity of the light emitted from the light emitter 32 within the interior 18 of the collar 10 which may not be absorbed by the mark 48 on the rod 40. The intensity of the light within the interior 18 of the collar 10 which may be detected by the light detector 34 may correspond to and/or may be based on the second position P2 of the mark 48 within the interior 18 of the collar 10. The light detector 34 may determine and/or may identify that the mark 48 may be at the second position P2 and/or may be located adjacent to the opening 28 of the collar 10, the interior 26 of the compartment 20, the light emitter 32 and/or the light detector 34. The light detector 34 may transmit the output signal indicative of the intensity of the light within the interior 18 of the collar 10 that may not be absorbed by the mark 48 and/or indicative of the second position P2.

FIG. 4 illustrates, in a black box diagram, an embodiment of a system 100 of the present invention. The system 100 may have the light emitter 32 and/or the light detector 34 which may determine, may measure and/or may identify the intensity of the light within the interior 18 of the collar 10 that may not be absorbed by the exterior surface 46 and/or by the mark 48 of the rod 40. The output signal from the light detector 34 may be transmitted to the microprocessor 102 for signal interpretation and/or processing. The microprocessor 102 may determine, may identify and/or may detect the first position P1 and/or the second position P2 of the mark 48 within the interior 18 between the first end 12 and the second end 14 of the collar 10. As a result, the microprocessor 102 may locate the mark 48 and/or the rod 40 within the interior 18 of the collar 10 based on the intensity of the light that may not be absorbed by the mark 48 and/or the exterior surface 46 of the collar 10.

The microprocessor 102 may be located locally with respect to the collar 10, the light emitter 32 and/or the light detector 34. The microprocessor 102 may be connected to and/or may be in communication with the light emitter 32 and/or the light detector 34 via the cable 36. In an embodiment, the microprocessor 102 may be located remotely with respect to the collar 10, the light emitter 32 and/or the light detector 34. The microprocessor 102 may be connected to and/or may be in communication with the light emitter 32 and/or the light detector 34 via a data communication network 104 (hereinafter "the network 104"). The microprocessor 102 may be programmed to operate, to activate and/or to deactivate the machine element 110 to move the mark 48 to the first position P1 and/or the second position P2 within the interior 18 of the collar 10. The microprocessor 102 may instruct and may control the machine element 110 for moving the mark 48 to the first position P1 and/or to the second position P2. As a result, the machine element 110 may move the mark 48 to the first position P1 or to the second position P2 within the interior 18 of the collar 10.

The network 104 may be a fixed network, such as, for example, a cabled network, a permanent network and/or the like. The network 104 may be a temporary network, such as, for example, a modem network, a null modem network and/or the like. The network 104 may be, for example, a local area network, a metropolitan area network, a wide area network, a personal area network and/or the like. Alternatively, the network 104 may be a wireless network, such as, for example, a wireless metropolitan area network, a wireless local area network, a wireless personal area network, a global standard network, a personal communication system network, a pager-based service network, a general packet radio service, a universal mobile telephone service network, a radio access network and/or the like. The present invention should not be limited to a specific embodiment of the network 104. It should be understood that the network 104 may be any network capable of transferring and/or of transmitting output signal as known to one having ordinary skill in the art.

A display unit 106 and/or a printer 108 may be connected to the network 104 and/or to the microprocessor 102. The display unit 106 and/or the printer 108 may be located remotely or may be located locally with respect to the microprocessor 102 and/or with respect to the collar 10. The display unit 106 and/or the printer 108 may display and/or may render information and/or data to a user (not shown in the figures) which may relate to the first position P1 of the mark 48, the second position P2 of the mark 48, the rod 40 and/or the intensity of the light within the interior 18 of the collar 10 that may not be absorbed by the mark 48 and/or by the exterior surface 46 of the rod 40. It should be understood that the display unit 106 and/or the printer 108 may be any display unit and/or any printer, respectively, that may be capable of displaying and/or rendering the information and/or the data to the user.

The collar 10 may have the light emitter 32 and/or the light detector 34 to determine, to detect and/or to identify that the mark 48 may be located at the first position P1 and/or at the second position P2 within the interior 18 of the collar 10. The light emitter 32 may transmit, may emit and/or may project the emitted light into the interior 18 of the collar 10 via the opening 28 of the collar 10 and/or the interior 26 of the compartment 20. The light detector 34 may measure, may determine and/or may detect the intensity of the emitted light within the interior 18 of the collar 10 that may be not be absorbed by the exterior surface 46 of the rod 40 to determine the first position P1 of the mark 48 within the interior 18 of the collar 10. The light detector 34 may measure, may determine and/or may identify the intensity of the emitted light within the interior 18 of the collar 10 that may not be absorbed by the mark 48 to identify and/or to determine the second position P2 of the mark 48 within the interior 18 of the collar 10.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A system for locating a position of a rod wherein the rod has a length defined between a first end and a second end and further wherein the rod has an exterior surface connecting the first end and the second end, the system comprising:

exterior walls defining an interior wherein the exterior walls have a length defined between a first end and a second end wherein the rod is insertable into the interior;

an aperture formed within the exterior walls wherein the aperture is located between the first end and the second end of the exterior walls wherein light projects through the aperture into the interior of the exterior walls wherein the light has a color;

a mark displayed on the exterior surface of the rod between the first end and the second end wherein a color of the mark corresponds to the color of the light wherein the mark is substantially co-planar with the rod so that the mark does not project from the rod wherein the mark has a color; and a light detector connected to the exterior walls wherein the light detector is adjacent to the aperture within the exterior walls wherein the light detector detects an intensity of light within the interior of the exterior walls wherein the intensity of the light corresponds to an amount of light that is absorbed by the mark wherein the intensity of light detected by the light detector corresponds to a position of the mark within the interior of the exterior walls.

2. The system of claim 1 further comprising:
a light emitter connected to the exterior walls wherein the light emitter is adjacent to the aperture within the exterior walls.

3. The system of claim 1 wherein the intensity of light detected by the light detector corresponds to an amount of light that is absorbed by the exterior surface of the rod.

4. The system of claim 1 further comprising:
a compartment connected to the exterior walls wherein the compartment is adjacent to the aperture within the exterior walls.

5. The system of claim 1 further comprising:
a seal connected to the exterior walls wherein the seal is located between the light detector and the aperture within the exterior walls.

6. The system of claim 1 further comprising:
a cable connected to the light detector wherein the cable extends outwardly with respect to the exterior walls.

7. A system for determining a position of a rod wherein the rod has an exterior surface connecting a first end of the rod and a second end of the rod, the system comprising:
a mark located on the exterior surface of the rod between the first end and the second end;
a compartment having a base and exterior walls wherein the exterior walls are attached to the base wherein the exterior walls and the base define an interior of the compartment wherein an aperture is formed in the exterior walls of the compartment wherein light projects through the aperture into the interior wherein the light has a color wherein the color of the light is the same as the color of the mark wherein the rod moves from a first position to a second position with respect to the aperture of the compartment wherein the exterior surface of the rod is adjacent to the aperture of the compartment in the first position and further wherein the mark on the rod is adjacent to the aperture of the compartment in the second position; and
a light detector connected to the base of the compartment wherein the light detector is opposite to the aperture of the compartment wherein the light detector is within the interior of the compartment wherein the light detector detects an intensity of light within the interior of the compartment which is not absorbed by the mark on the rod or the exterior surface of the rod wherein the intensity of light corresponds to the first position or the second position of the rod with respect to the aperture of the compartment.

8. The system of claim 7 further comprising:
a light emitter connected to the compartment wherein the light emitter emits the light through the aperture into the interior of the compartment.

9. The system of claim 7 wherein the mark is a paint that is applied to the exterior surface of the rod.

10. The system of claim 7 further comprising:
a seal connected to the compartment wherein the seal is located between the exterior surface of the rod and the exterior walls of the compartment.

11. The system of claim 7 further comprising:
a microprocessor connected to the light detector wherein the microprocessor detects the first position or the second position of the rod with respect to the aperture of the compartment.

12. The system of claim 7 further comprising:
a data communication network connected to the light detector wherein the light detector is accessible via the data communication network.

13. The system of claim 7 further comprising:
an output signal indicative of the intensity of light within the interior of the compartment wherein the output signal is transmittable by the light detector.

14. A method for detecting a location of a rod wherein the rod has an exterior surface connecting a first end of the rod and a second end of the rod, the method comprising the steps of:
applying a mark to the exterior surface of the rod between the first end and the second end of the rod wherein the mark has a color and further wherein the mark does not project from the rod;
providing a collar having a length defined between a first end and a second end wherein the collar has exterior walls defining an interior wherein a rod is located within the interior of the collar wherein the rod is located at a first position within the interior of the collar wherein an aperture is formed within the exterior walls of the collar wherein the first position of the rod is adjacent to the aperture;
detecting an intensity of light within the interior of the collar wherein the intensity of light corresponds to a first amount of light which is not absorbed by the exterior surface of the rod or a second amount of light which is not absorbed by the mark wherein the light has a color and further wherein the color of the mark and the color of the light are the same; and
determining the first position of the rod within the interior of the collar wherein the first position of the rod corresponds to the intensity of light detected within the interior of the collar.

15. The method of claim 14 further comprising the step of:
moving the rod from the first position to a second position within the interior of the collar.

16. The method of claim 14 further comprising the step of:
connecting a machine element to the rod wherein the machine element moves the rod within the interior of the collar between the first end of the collar and the second end of the collar.

17. The method of claim 14 further comprising the step of:
forming the aperture within the exterior walls of the collar wherein the light is emitted into the interior of the collar via the aperture.

18. The method of claim 14 further comprising the step of: connecting a light detector to the collar wherein the light detector detects that the rod is located in the first position or the second position within the interior of the collar.

19. The method of claim 14 further comprising the step of: connecting a light emitter to the collar wherein the light emitter emits light into the interior of the collar.

20. The method of claim 14 further comprising the step of: connecting a microprocessor to the collar wherein the microprocessor detects that the rod is located in the first position.

* * * * *